Figure 1:
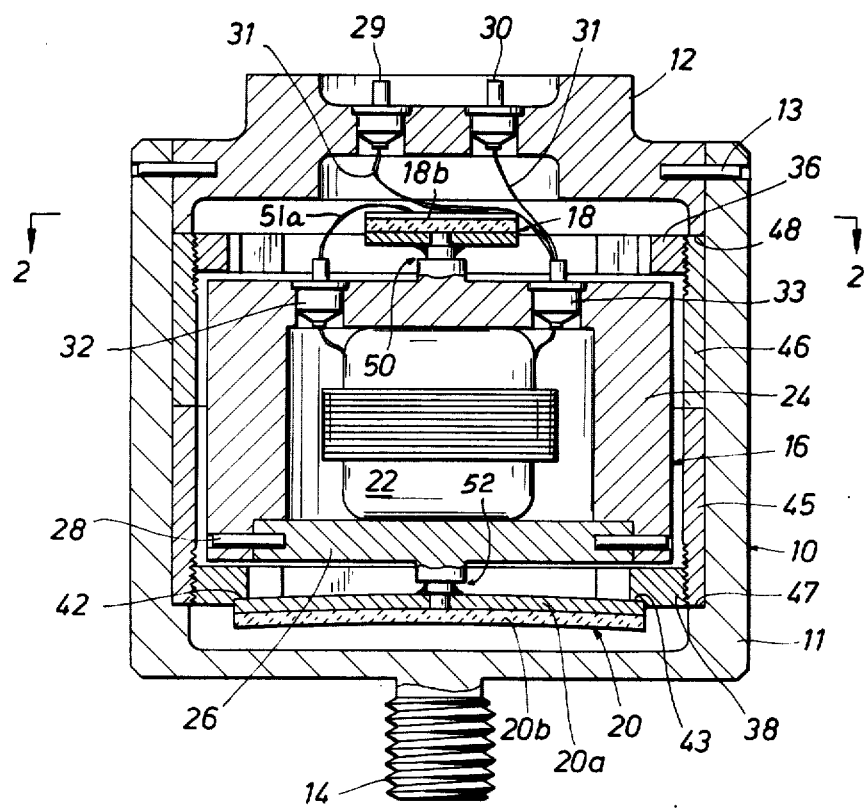

United States Patent [19]
Florian et al.

[11] 3,893,342
[45] July 8, 1975

[54] ACCELEROMETER

[75] Inventors: Eugene F. Florian; Samuel E. Haggard, both of Houston, Tex.

[73] Assignee: Mark Products, Inc., Houston, Tex.

[22] Filed: May 21, 1973

[21] Appl. No.: 362,538

[52] U.S. Cl. .............................. 73/517 R; 310/8.4
[51] Int. Cl. .......................................... G01p 15/08
[58] Field of Search ....... 73/516 R, 517 R, 517 AV, 73/DIG. 4; 310/8.4, 8.5

[56] References Cited
UNITED STATES PATENTS

| 2,836,738 | 5/1958 | Crownover | 310/8.5 |
| 3,186,237 | 6/1965 | Forrest | 73/517 R |
| 3,241,373 | 3/1966 | Ricketts et al. | 73/517 R X |

Primary Examiner—James J. Gill
Attorney, Agent, or Firm—Bargfrede and Thompson

[57] ABSTRACT

The accelerometer disclosed has two beams located in a housing with a mass supported between the beams for movement along one axis. Each beam has a first layer of a material having a relatively high tensile strength and a second layer of piezoelectric material. The beams are prestressed when the accelerometer is assembled to place the first layer in tension and the piezoelectric layer of material in compression sufficiently to avoid imposing tensile stress on the piezoelectric material during normal operation of the accelerometer.

12 Claims, 2 Drawing Figures

PATENTED JUL 8 1975 3,893,342

ACCELEROMETER

This invention relates to accelerometers generally, and in particular to accelerometers that employ piezoelectric material to indicate the amount of the acceleration imposed on the meter.

Piezoelectric material is useful in accelerometers since a change in the stress in the material due to the acceleration imposed on the mass connected to the material will produce an electrical signal proportional to the acceleration. Most piezoelectric materials, such as quartz, are of crystalline structure and, consequently, have little, if any, tensile strength. Such materials, however, do have good compressive strength.

Therefore, it is an object of this invention to provide an accelerometer having piezoelectric material arranged to produce an electrical signal proportional to the acceleration imposed on the meter with the piezoelectric material in compression at all times.

It is another object of this invention to provide an accelerometer having piezoelectric material that is prestressed so as to be under compression when the accelerometer is at rest with the mass therein limited in its movement to keep the mass from moving far enough to place the piezoelectric material in tension.

It is a further object of this invention to provide an accelerometer including a mass supported in a housing by two beams that clamp the mass between them, each beam having a layer of piezoelectric material that is held in compression by the mass.

These and other objects, advantages, and features of this invention will be apparent to those skilled in the art from a consideration of this specification including the attached drawings and appended claims.

Figure 2:
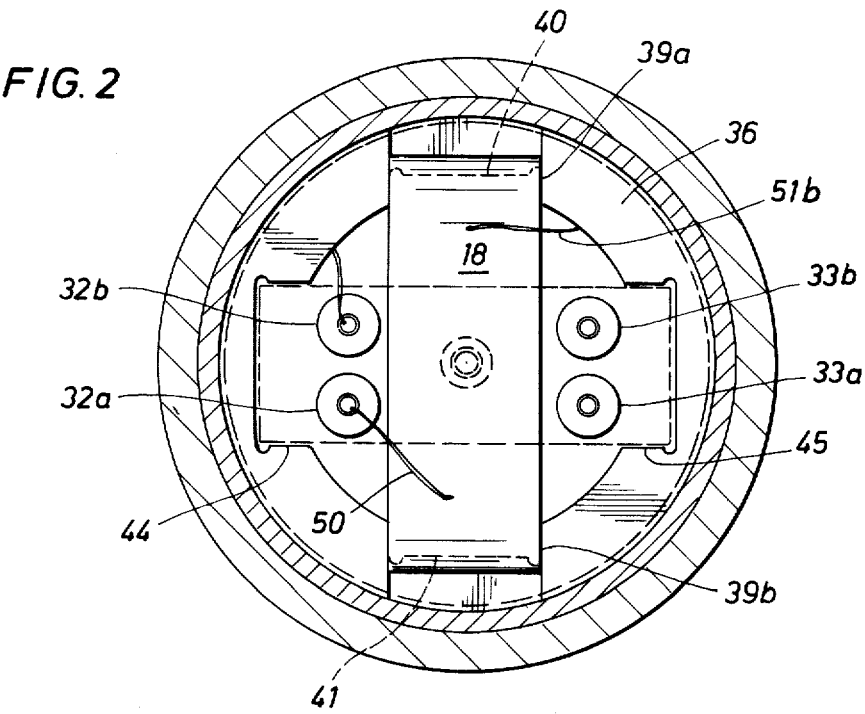

In the drawings:

FIG. 1 is a vertical sectional view of the preferred embodiment of the accelerometer of this invention; and FIG. 2 is a sectional view taken along line 2—2 of FIG. 1.

Housing 10 of the accelerometer includes cup-shaped housing member 11 and cap 12 that closes the open end of the cup-shaped member. Rivets 13 extending through the wall of the cup-shaped member into openings in the cap secure the cap in position to close the open end of housing member 11. Threaded boss 14 is provided for mounting the accelerometer to a base or whatever.

Mass 16 is supported in the housing by beams 18 and 20. In this embodiment, the mass includes transformer 22 that is positioned in a housing made up of cup-shaped housing member 24 and end member 26 that closes the open end of cup-shaped housing member 24. Rivets or pins 28 hold end member 26 in position closing the open end of the cup-shaped housing member. Transformer 22 is clamped between the end of cup-shaped housing member 24 and end member 26 when the housing is assembled as shown.

As stated above, the mass is supported in housing 10 by beams 18 and 20. Means are provided to support the beams in the housing to so support the mass. In the embodiment shown, beam 18 is supported at opposite ends by seat 36 while beam 20 is supported at opposite ends by seat 38. The seats are identical in shape and, as shown in FIG. 2, are generally disc-shaped having oppositely opposed slots 39a and 39b to receive and locate beam 18 with respect to seat 36. The end of each slot is provided with a notch to engage the end of the beam to keep it from moving through the slot in one direction. In seat 36, the ends of beam 18 rest on surfaces 40 and 41 provided by these notches. As shown in FIG. 1, surfaces 42 and 43 engage the ends of beam 20. Each seat is provided with two additional diametrically opposed openings or slots, such as slots 44 and 45 in seat 36, as shown in FIG. 2, for assembly purposes as will be described below.

The remainder of the beam supporting means of this embodiment include lower threaded sleeve 45 and upper threaded sleeve 46. These sleeves are of equal diameter and threaded adjacent their opposite ends to engage the threads on the outside surfaces of seats 36 and 38. When the entire accelerometer is assembled, these two sleeves are fixed between upwardly facing shoulder 47 on housing member 11 and downwardly facing annular shoulder 48 on cap member 12 of the housing.

Beams 18 and 20 are identical in structure. They are rectangular in shape and include first layers 18a and 20a of a resilient material having a relatively high tensile strength, such as beryllium copper. The beams include second layers 18b and 20b of a piezoelectric material, such as quartz. The two layers are bonded together so that they will bend together when the beams are loaded.

As shown, housing 16 of the mass has oppositely extending cylindrical bosses 50 and 52. These bosses have portions of decreasing diameter. The outer portions extend through an opening in the center of layers 18a and 20a, with the next portions providing shoulders to limit the extent the outer portions of the bosses can extend into the beams. The middle portions of the bosses are then welded or braised to layers 18a and 20a of the beams to secure the beams to the mass assembly. To add lateral rigidity to the support for the mass in the housing, preferably the beams are attached to the housing to extend so that their longitudinal axes lie in planes that are perpendicular to each other.

So assembled, the piezoelectric layers of the beams are on the opposite side from the mass supported therebetween. Therefore, when assembled, seats 36 and 38 are moved apart to prestress the beams so as to place layers 18b and 20b of the beams in compression. In other words, the beams are bent away from the mass, as shown in FIG. 1. As assembled, then, the accelerometer will measure forces of acceleration imposed thereon along an axis extending longitudinally of the mass and perpendicular to the beams. In order to avoid reversal of stress in the beams which would place a tensile stress in the piezoelectric material, the space between mass assembly 16 and seats 36 and 38 is such that the relative movement between the mass and the housing is limited to prevent producing a complete removal of the compressive stress in the piezoelectric material layer of the beams. In other words, the housing of the mass will engage either seat 36 or 38 and be prevented from further movement in that direction before there is a reversal of stress in the beams.

To assemble the accelerometer, the transformer is first assembled in its housing, with bosses 50 and 52 welded or braised to beams 18 and 20. To assemble the beam supports and to pre-stress the beams the desired amount, seats 36 and 38 are provided with slots to allow them to be moved over the beams. This is the purpose of slots 44 and 45 in seat 36. Similar slots are provided in seat 38. Seat 38, then, is moved over beam 20 and rotated until beam 20 is positioned in slots provided therefor. This places the end of the beam in engagement with surfaces 42 and 43, as shown in FIG. 1. Threaded member 45 is then moved over the mass assembly and readily connected to seat 38. It is rotated far enough down over the seat to allow threaded member 46 to be dropped in place and then seat 36 moved over beam 18 and rotated into position for surfaces 40 and 41 to engage the ends of the beam. Then the two threaded sleeve members 45 and 46 are rotated to place the desired prestress in the beams. For convenience in this respect, the threads on one of the sleeves and seats should be left hand, and the threads on the other seat and sleeve should be right hand to allow the rotation of the sleeve to move the two seats apart like a turnbuckle.

When the desired prestress is placed in the beams and the clearance between the seats and mass housing 16 is the desired amount, the entire assembly can be placed in cup-shaped housing member 11 of the accelerometer and the assembly completed.

Electrical connections, of course, are provided between the piezoelectric portion of the beams and transformer 22.

The layers of piezoelectric material 18b and 20b are preferably coated with a good conductor of electricity, such as silver. Terminals 32a and 32b are connected to the secondary of the transformer. Terminal 32a receives the output of the piezoelectric material of the beams through lead 51a. The two beams are electrically connected by lead 51b. Terminal 32b is connected to ground. Terminals 33a and 33b are connected to the primary windings of the transformer and to terminals 29 and 30 mounted in cap 12 of the housing.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. An accelerometer comprising a housing, two beams located in the housing, means in the housing supporting the beams in spaced generally parallel planes, each beam comprising a first layer of material of relatively high tensile strength and a second layer of piezoelectric material, and a mass located between the beams and supported thereby, said beams being bent by the mass to place the piezoelectric material layer of the beams in compression and the high tensile strength layer of the beams in tension.

2. The accelerometer of claim 1 further provided with means to limit the movement of the mass to keep the piezoelectric layer of the beams in compression.

3. The accelerometer of claim 1 in which the means supporting the beams engages the beams adjacent their ends and the mass is connected to the beams between the ends thereof.

4. The accelerometer of claim 3 in which the layer of each beam is piezoelectric material is on the side of the beam away from the mass and the mass bends the beams toward each other to place the piezoelectric material in compression.

5. The accelerometer of claim 4 in which the means supporting the beams in the housing includes means for adjusting the spacing between the ends of the beams and the amount of compression in the piezoelectric material layer of the beams.

6. The accelerometer of claim 1 in which the mass includes a transformer electrically connected to the piezoelectric material to receive the electrical signals produced by the material when the stress therein is varied due to acceleration forces imposed on the housing.

7. An accelerometer for sensing acceleration along a selected axis, comprising a housing, a mass located in the housing, means supporting the mass in the housing for limited movement relative to the housing along said selected axis, said supporting means including two beams located on opposite sides of the mass and extending transverse said axis of movement of the mass, means carried by the housing to support the ends of the beams whereby movement of the mass along said axis relative to the housing will bend the beams, each beam comprising a first layer of relatively high tensile strength material extending between the support means and a second layer of piezoelectric material, said beams being bent by the mass and the support means, when the mass and housing are at rest, to place the material of high tensile strength of each beam in tension and the piezoelectric material in compression sufficiently for a compressive stress to remain in the piezoelectric material for substantially all relative movements of the mass and the housing due to expected accelerations along said selected axis.

8. The accelerometer of claim 7 further provided with means to limit the movement of the mass to keep the piezoelectric layer of the beams in compression.

9. The accelerometer of claim 7 in which the mass includes a transformer.

10. The accelerometer of claim 7 in which the beam support means includes means to adjust the stress in the beams.

11. The accelerometer of claim 7 in which the beams are rectilinear and their longitudinal axes lie in perpendicular planes.

12. The accelerometer of claim 7 in which the second layer of piezoelectric material of each beam is on the sides of the beams away from the mass and means connect the mass to the beams between the ends of the beams to exert a force on the beams placing the second layer in compression.

* * * * *